United States Patent [19]

November

[11] 4,411,161
[45] Oct. 25, 1983

[54] MASS FLOWMETER OR THE LIKE

[75] Inventor: Milton H. November, Hacienda Heights, Calif.

[73] Assignee: International Telephone & Telegraph Corporation, New York, N.Y.

[21] Appl. No.: 291,569

[22] Filed: Aug. 10, 1981

[51] Int. Cl.³ .......................... G01F 1/90; G01F 15/04
[52] U.S. Cl. ................................. 73/861.03; 73/32 A
[58] Field of Search ............... 73/861.02, 861.03, 32 A

[56] References Cited

U.S. PATENT DOCUMENTS

| 3,902,365 | 9/1975 | Knauth | 73/861.03 |
| 4,088,022 | 5/1978 | Kalotay | 73/861.78 |
| 4,262,523 | 4/1981 | Stansfeld | 73/861.03 |
| 4,349,881 | 9/1982 | November et al. | 73/32 A X |

Primary Examiner—Charles A. Ruehl

Attorney, Agent, or Firm—T. E. Kristofferson; A. D. Stolzy

[57] ABSTRACT

A quartz tuning fork in a chamber adjacent a gas pipeline carrying a turbine flowmeter. The chamber is connected across the flowmeter turbine to receive a gas at a flow rate high enough to cause the tuning fork to vibrate. A main output frequency is developed which is directly proportional to the product of a function of the tuning fork period of vibration and the turbine meter output signal frequency. The main output frequency is then counted and is displayed on an indicator, the constants of the circuit being so selected that the indicator displays total flow in units of mass. The density sensor measures the gas density at the turbine flowmeter rotor location. This obviates the requirement for expansion factor corrections.

8 Claims, 7 Drawing Figures

MASS FLOWMETER OR THE LIKE

BACKGROUND OF THE INVENTION

This invention relates to means to provide a gas flow indication, and more particularly to a mass flowmeter or the like.

PRIOR ART STATEMENT

The following U.S. patents are related to the flowmeter of the present invention.

M. H. November, U.S. Pat. No. 3,756,079, issued Sept. 4, 1973, discloses a turbine flowmeter, one of which may be employed with the present invention as otherwise disclosed herein.

G. L. Schlatter, U.S. Pat. No. 3,769,831, issued Nov. 6, 1973, discloses a gas vibration densitometer flow equation substantially identical to one disclosed in the present application. The one in the instant case uses only slightly different symbols.

In the aforesaid Schlatter patent, see especially equation (2) to line 20 in column 14. See also the equation in claim 1, column 18.

G. L. Schlatter, U.S. Pat. No. 3,878,374, issued Apr. 15, 1975, discloses some component parts which may be employed in the flowmeter of the present invention.

C. E. Miller et al., U.S. Pat. No. 3,677,067, issued July 18, 1972, discloses a vibration densitometer and a calibration method for use herein.

SUMMARY OF THE INVENTION

In accordance with the flowmeter of the present invention, there is provided means including a turbine meter having a rotor rotatable in a pipe section for producing pulses at a repetition frequency $f_o$, and a quartz tuning fork immersed in a diverted portion of fluid flowing through said pipe section to produce an output signal in accordance with the vibration of the tuning fork (of frequency f and period T), and means to produce an output directly proportional to mass flow rate $\dot{m}$ of said fluid, where $$\dot{m} = K f_o (A T^2 + B T + C) \quad (1)$$

where
- A is a positive constant,
- B is a constant,
- C is a positive or negative constant,
- K is a positive constant, and
- B is either positive or negative or zero.

BRIEF DESCRIPTION OF THE DRAWINGS

In the accompanying drawings which illustrate exemplary embodiments of the present invention:

FIG. 6 is a block diagram of a conventional frequency multiplier; and

DESCRIPTION OF THE PREFERRED EMBODIMENT

The entire contents of one of applicant's copending applications is hereby incorporated herein by this reference hereto as though set forth fully herein hereat. Said one copending application is Ser. No. 168,709, filed July 14, 1980, for Vibration Instruments, now U.S. Pat. No. 4,349,881.

Figure 1:
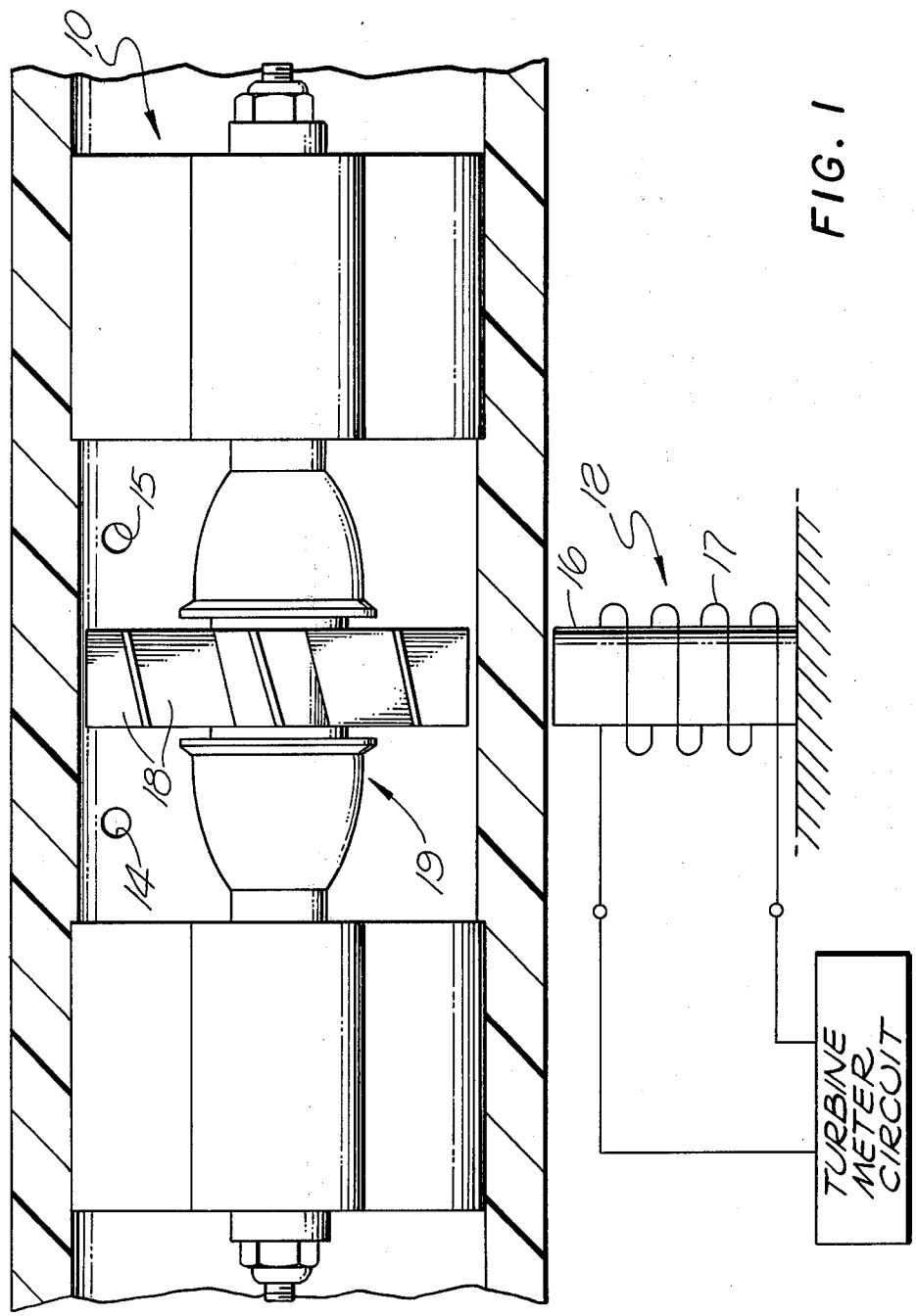
FIG. 1 is a longitudinal sectional view, partly in elevation, of a turbine flowmeter which may be employed in the present invention.

In FIG. 1, an assembly 10 is shown including a rotor 19 with blades 18, rotor 19 being rotatable inside a pipe section 11. Assembly 10 and pipe section 11 with an RF or electromagnetic pick-up 12 and a circuit 13 (FIG. 5) form an entirely conventional turbine flowmeter except for two holes 14 and 15 (FIG. 1). All these structures, except the holes 14 and 15 are disclosed in the said M. H. November patent. Each of the holes 14 and 15 extend completely through the thickness of the wall of pipe section 11.

Figure 5:
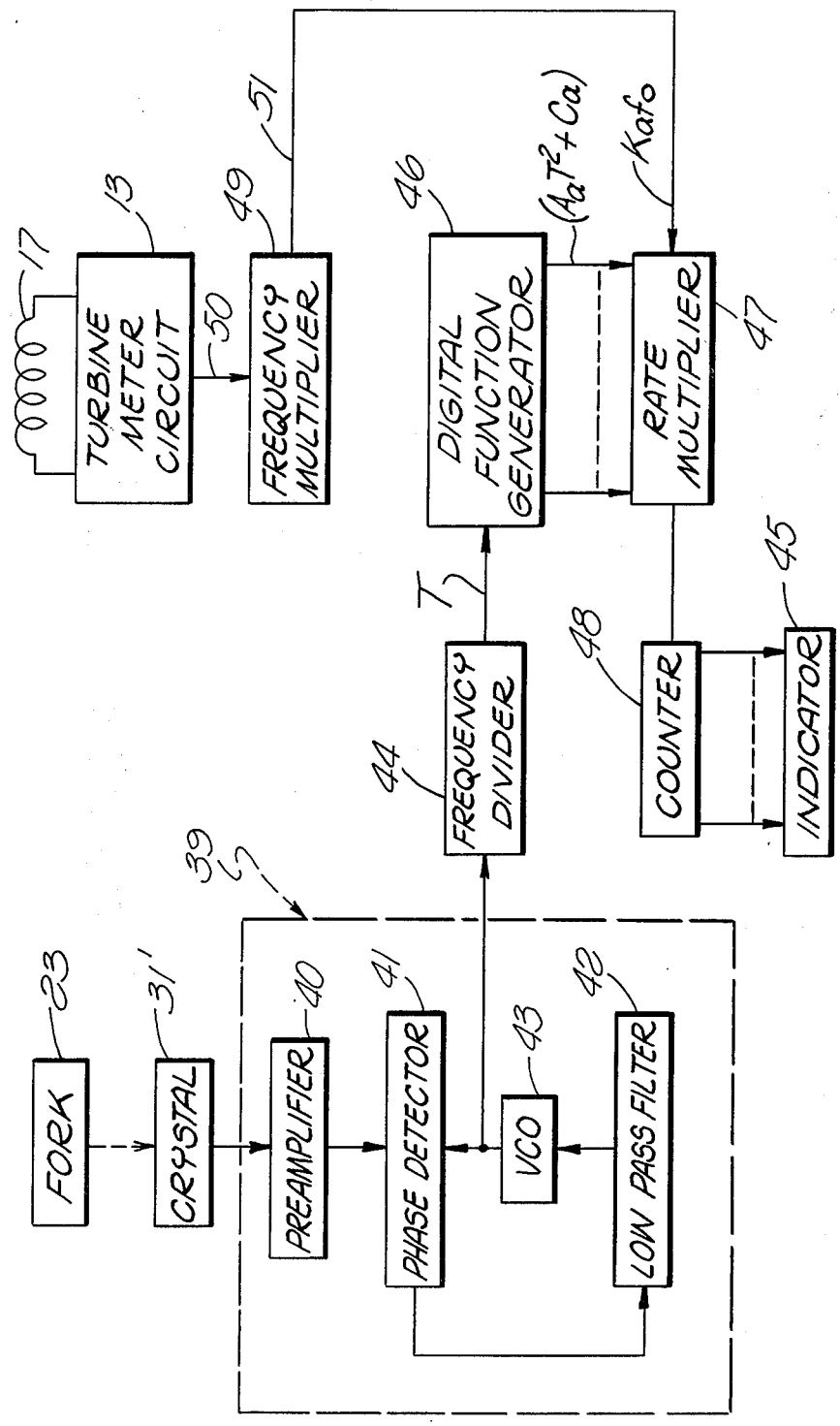
FIG. 5 is a block diagram of one embodiment of the flowmeter of the present invention.

Pick-up 12 may include a ferromagnetic core 16 with a winding 17 therearound connected to circuit 13 as shown in FIG. 5. Pipe section 11 may be non-magnetic. Winding 17 generates a pulse and impresses it upon circuit 13 (FIG. 5) each time the end of a rotor blade 18 passes close thereto, this per se being conventional.

Figure 2:
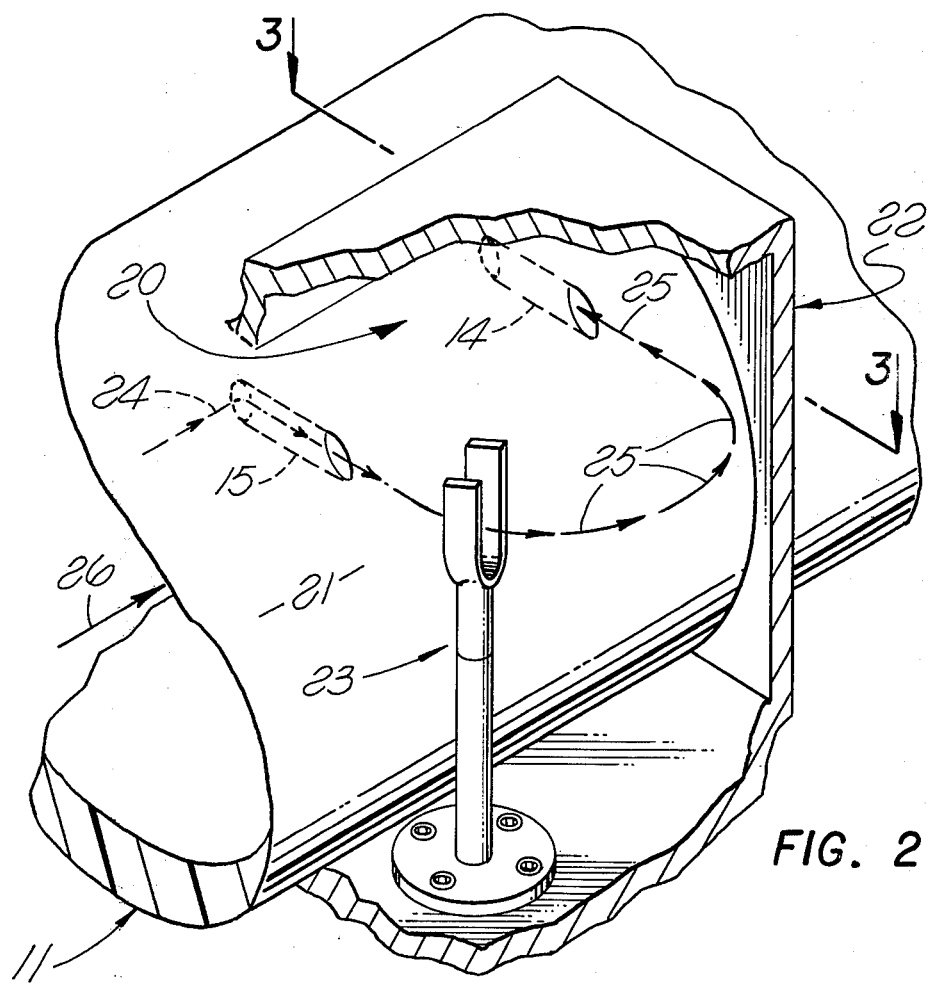
FIG. 2 is a perspective view of the turbine flowmeter of FIG. 1 and density measuring apparatus constructed in accordance with the present invention.

As shown in FIG. 2, a sealed space 20 is defined by a portion 21 of the external surface of pipe section 11 and a housing 22 sealed around surface portion 21 to the external surface of pipe section 11.

A quartz tuning fork 23 is mounted on housing 22 in a position to be vibrated by gas entering one of the holes 14 and 15 and exiting the other. Note arrows 24 and 25. Note also in FIG. 1 that circulation according to arrows 24 and 25 is caused, at least in part, by the pressure drop across rotor 19. Notice that holes 14 and 15 are located on opposite sides of rotor 19 in FIG. 1.

Gas flow in pipe section 11 may be, for example, in the direction of an arrow 26 (FIG. 2).

Figure 3:
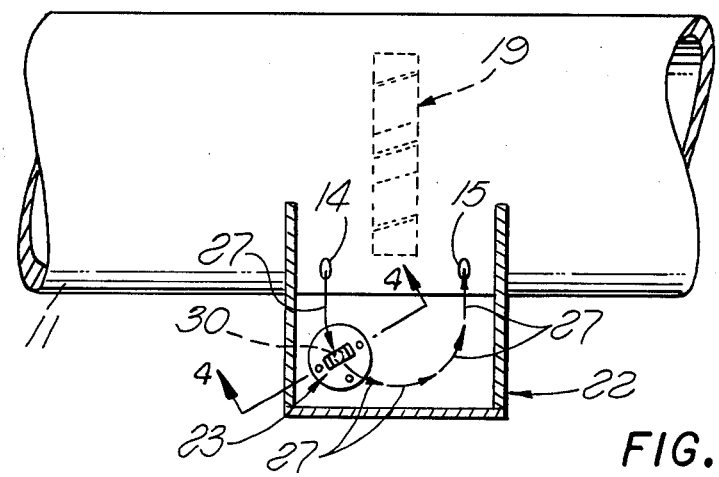
FIG. 3 is a longitudinal sectional view taken on the line 3—3 of the flowmeter and other apparatus shown in FIG. 2.

In FIG. 3, arrows 27 illustrate the same gas flow as arrows 25 do in FIG. 2.

Figure 4:
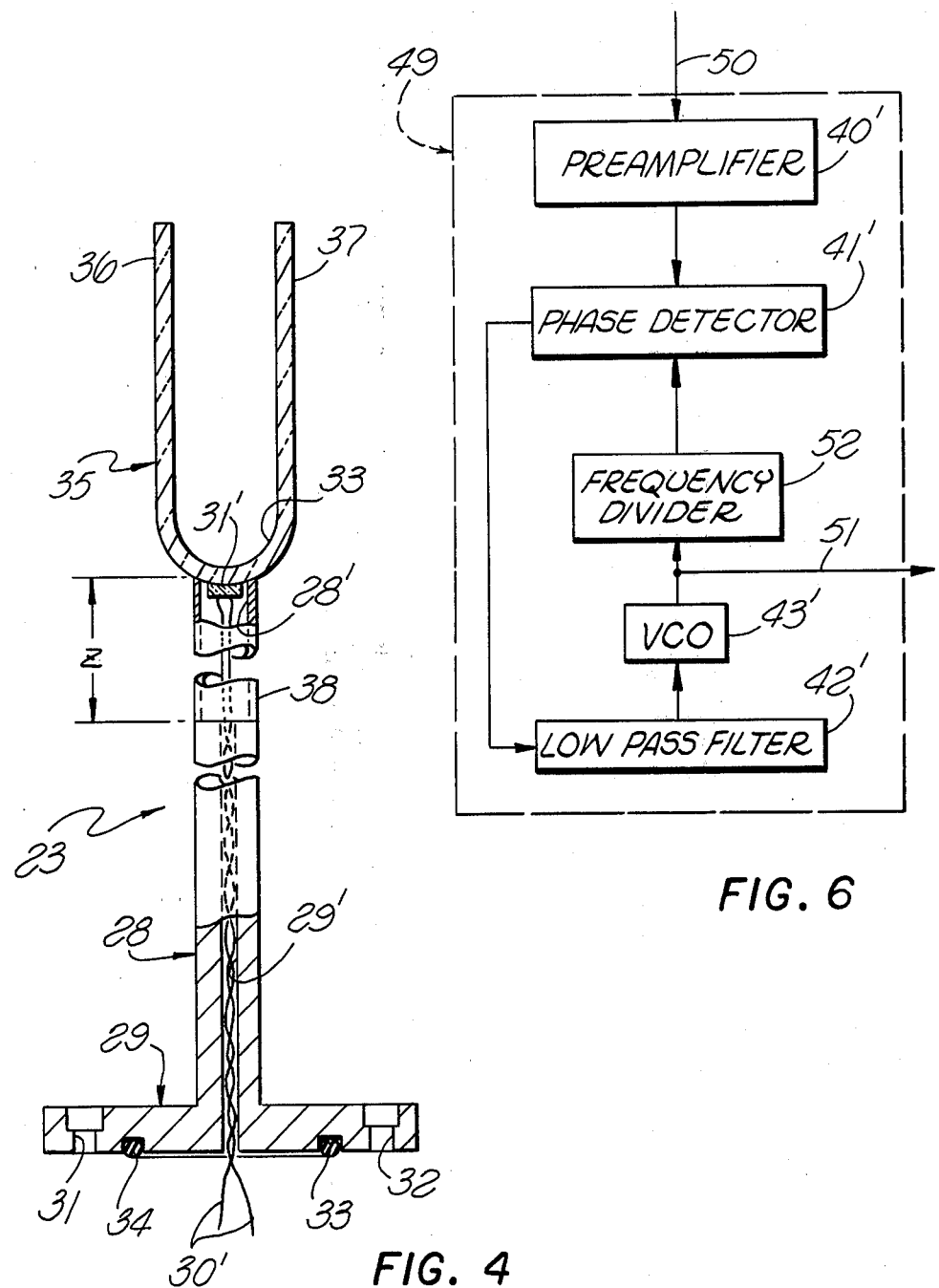
FIG. 4 is a vertical sectional view, partly in elevation, taken on the line 4—4 of the tuning fork shown in FIG. 3.

The view of FIG. 4 includes tuning fork 23 having a metal base 28 and a flange 29 therein which may be sealed concentrically around a hole 30 in housing 22 (see hole 30 in FIG. 3).

Cap screws may extend through holes 31 and 31 in flange 29 and housing 22. Flange 29 also has an O-ring groove 33 and an O-ring 34 therein to seal around hole 30.

Tuning fork 23 as shown in FIG. 4 may, if desired, be identical to that disclosed in said copending application except for the locations of groove 33 and O-ring 34.

In FIG. 4, tuning fork 23 includes a U-shaped member 35 having prongs 36 and 37. Tuning fork 23 includes a post 38 having one end fixed and sealed to member 35 and the other end to base 28.

Aligned passageways 28' and 29' are provided through post 38 and base 28, respectively, for lead wires 30' from a piezoelectric crystal 31' bonded to the bottom of member 35.

Member 35 has a bright portion 33 to which crystal 31' is fixed.

Gas flow against one or both tines or prongs 36 and 37 will cause the fork 23 to vibrate. Crystal 31' will then produce output pulses on wires 30' at a frequency proportional to a frequency f and corresponding period T ($f = 1/T$). The density d of the gas may be measured in the following way $$d = AT^2 + BT + C \qquad (2)$$

with A, B and C being constant. The volume flow rate is proportional to $Kf_o$ where K is a positive constant and $f_o$ is the output of a frequency multiplier 49. Thus mass flow rate $\dot{m}$ is $$\dot{m} = Kf_o(AT^2 + BT + C) \qquad (3)$$

When B = 0

$$\dot{m} = Kf_o(AT^2 + C) \qquad (4)$$

The frequency $f_o$ indicated in FIG. 5 is directly proportional to the pulse repetition frequency of the pulse train impressed upon circuit 13 by winding 17. Thus, $f_o$ is directly proportional to the gas volume flow rate in pipe section 11.

In FIG. 5, fork 23 is connected to crystal 31' which, in turn, is connected to a phase locked loop 39. Phase locked loop 39 may be entirely conventional including a preamplifier 40, a phase detector 41, a low pass filter 42 and a voltage controlled oscillator (VCO) 43 connected in succession in that order from crystal 31'.

A frequency divider is provided at 44. The output of divider 44 is connected to an indicator 45 via a digital function generator 46, a rate multiplier 47 and a counter 48.

The output of VCO 43 is connected to one input of each of phase detector 41 and frequency divider 44.

Frequency divider 44 likewise may be entirely conventional.

The output of circuit 13 is connected through frequency multiplier 49 to rate multiplier 47.

Circuit 13 may be any conventional turbine meter circuit. The same is true of corresponding pick-up 12.

Frequency multiplier 49 may be entirely conventional as shown in FIG. 6 where a lead 50 is connected from circuit 13 and a lead 51 is connected to rate multiplier 47.

Frequency multiplier 49 includes similar components connected identically to those of phase locked loop 39 except that a conventional frequency divider 52 is connected from the output of a VCO 43' to an input of a phase detector 41'. There are otherwise provided a preamplifier 40' and a low pass filter 42'.

OPERATION OF THE EMBODIMENT OF THE PRESENT INVENTION SHOWN IN FIG. 5

In FIG. 5 fork 23 vibrates at a frequency proportional to f and the density of the gas in space 20 is $d_a$ where $$d_a = A_aT^2 + C_a \qquad (5)$$

and $A_a$ and $C_a$ are constants,

1/T is directly proportional to said vibrational frequency.

Divider 44 may be omitted or replaced with a frequency multiplier, and, at the same or a different time, multiplier 49 may be omitted or replaced with a frequency divider.

The output of digital function generator 46 applied to rate multiplier 47 is directly proportional to density $d_a$. Digital function generator 46 is entirely conventional and may be identical to one of those disclosed in said Schlatter patent. Note the output of storage register 26', which among other components in FIG. 21 of Schlatter, may be included in generator 46 hereof.

Rate multiplier 47, counter 48 and indicator 45 each may be entirely conventional.

Thus, crystal 31' in FIG. 5 produces an output signal of a frequency proportional to f, where $$f = 1/T \qquad (6)$$

and T is proportional to the vibrational period of the fork 23. The crystal output signal is then processed in the conventional way by phase locked loop 39, and then frequency divided by divider 44 to produce the T input to digital function generator 46.

The output (input to rate multiplier 47) of digital function generator 46 is directly proportional to $A_aT^2 = C_a$.

Winding 17 causes circuit 13 and frequency multiplier 49 to produce pulses from the latter of a frequency $Kf_o$ directly proportional to the angular velocity of turbine rotor 19.

Rate multiplier 47 produces a total number of output pulses proportional to the total mass flow through turbine meter section 11. These pulses are accumulated by counter 48, and indicator 45 is calibrated to show total mass.

For an explanation of the terms $A_aT^2 + C_a$, see the said copending application. Many prior art patents and other publications disclose that a frequency equal to or proportional to $f_o$ or the like is proportional to volume flow in a pipeline (through a turbine meter).

The rate at which pulses will appear at the output of rate multiplier 47 will be $$K_af_o(A_aT^2 + C_a) \qquad (7)$$

Constants $K_a$, $A_a$ and $C_a$ may be determined empirically. See the said C. E. Miller et al. patent for $A_a$ and $C_a$. $K_a$ may be determined by comparing the indication at 45 with mass flow measurement by a known standard.

Figure 7:
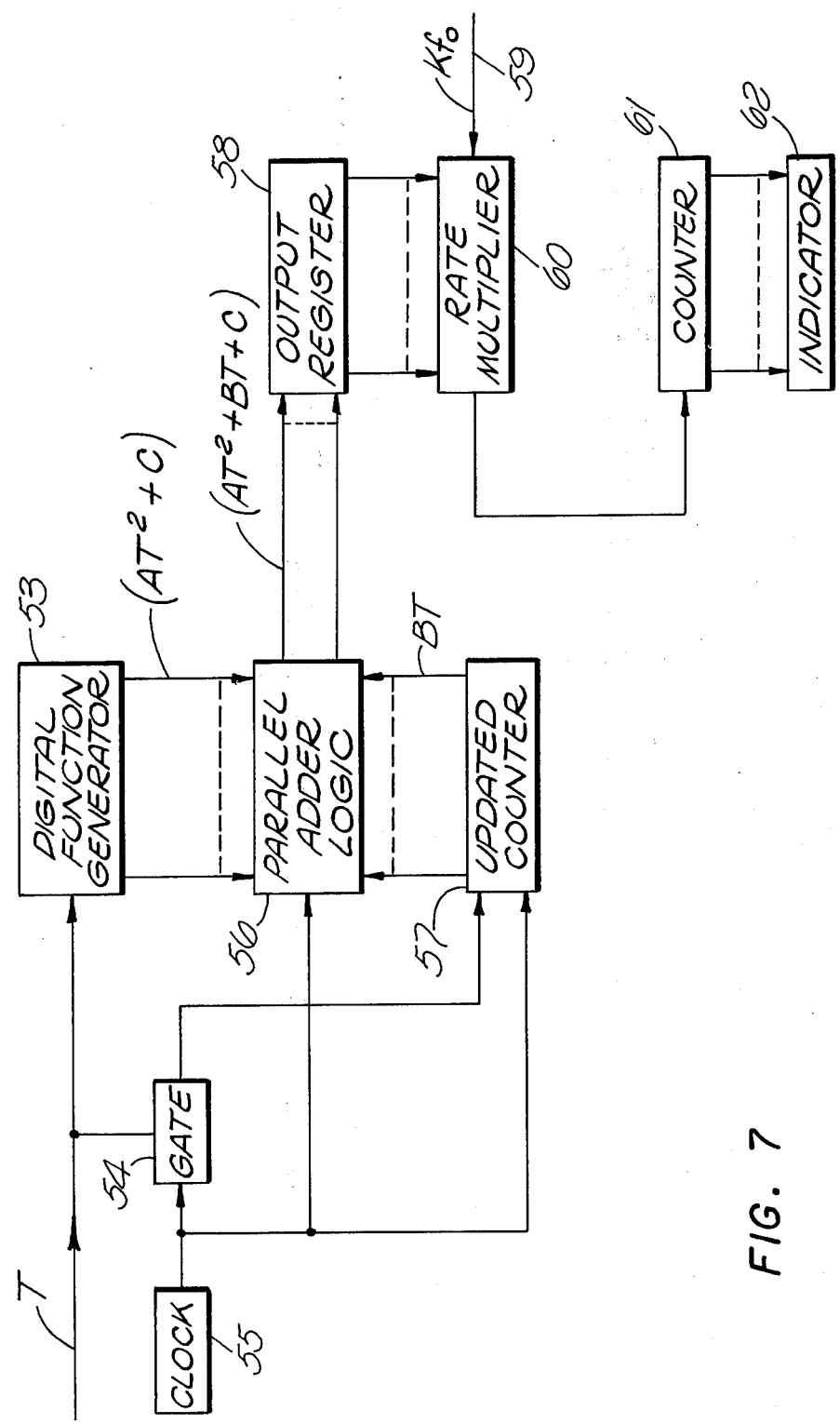
FIG. 7 is a block diagram of an additional embodiment of the present invention.

An alternative embodiment of the present invention is shown in FIG. 7 including a digital function generator 53 and a gate 54 to be connected from the output lead of divider 44.

A clock 55 is provided which is connected to gate 54, to logic 56 for a parallel adder and to an updated counter 57. The output of gate 54 is connected to counter 57.

The output register of logic (circuit) 56 is shown at 58. Register 58 and a lead 59 inputs to a a rate multiplier 60. A counter 61 and an indicator 62 perform effectively the same functions as counter 48 and indicator 45, respectively, in FIG. 5.

OPERATION OF THE EMBODIMENT OF THE PRESENT INVENTION SHOWN IN FIG. 7

The output of updated counter 57 is directly proportional to BT. Gate 54 counts clock 55 when T is high (or low). The frequency $Kf_o$ arrives on lead 59 from frequency multiplier 49 as before.

Digital function generator 53 may be identical to digital function generator 46 (FIG. 5).

The output of digital function generator 53 is directly proportional to the density of the gas in section 11, i.e., proportional to $$(AT^2+C) \qquad (8)$$

The output of register 58 is then proportional to $$(AT^2+BT+C) \qquad (9)$$

The output of rate multiplier 60 is then proportional to the gas mass flow rate within section 11. Total mass is counted in counter 61 as in counter 48. Total mass flow is then indicated by indicator 62 in the same manner as it is indicated by indicator 45.

The embodiment of the present invention shown in FIG. 7 may operate more accurately than that shown in FIG. 5 because of the extra term BT. The constant B, however, may be positive or negative or zero. The constants K, A, B and C may be determined by measuring T three times for a gas at three measured but different densities. The three unknown constants A, B and C are then determined from the following simultaneous equations $$d_i = AT_i^2 + BT_i + C \qquad (10)$$

$$d_j = AT_j^2 + BT_j + C \qquad (11)$$

$$d_k = AT_k^2 + BT_k + C \qquad (12)$$

in which everything is known except A, B and C.

The constants $A_a$ and $C_a$ are obtained as set forth in the said C. E. Miller et al. patent. The constants $K_a$ and K are selected so that indicators 45 and 62, respectively, read in known units of mass. This is done empirically by examining the corresponding indicator and comparing the same with total mass flow as measured by another standard.

In the said copending application, a system is disclosed for including fork vibrations by a feedback from a crystal. However, in the instant case, the fork 23 will vibrate in the absence of feedback from crystal 31'. Thus, both the densitometer and turbine flowmeter portions of the present invention may be operated without electrical power, with remote batteries or the like only for electronics. The instrument sensors are intrinsically safe.

A temperature correction may be made, if desired, as taught in the said copending application.

FIG. 5 is a special case of, and clearly equivalent to FIG. 7. Thus, all the claims herein are generic to both of FIGS. 5 and 7.

The turbinemeter and densitometer are essentially zero power. That is, both are operated by the flow of fluid without the need for electrical power.

What is claimed is:

1. A mass flowmeter comprising: a hollow cylindrical pipeline section having an external surface; first means fixed relative to said section to provide an enclosed space adjacent said surface; a quartz tuning fork fixed inside said space; a detector fixed relative to said tuning fork, said section having first and second passageways extending therethrough, said first passageway being provided to admit a portion of a gas flowing inside said section into said enclosed space, said entering gas moving into engagement with said tuning fork to cause the same to vibrate at a frequency which is a function of the density of said entering gas, gas in said space flowing out of said space through said second passageway and thus returning to the interior of said section; a turbine meter having a rotor rotatably mounted inside said section between said first and second passageways, said turbine meter producing output pulses at a pulse repetition frequency $f_o$ directly proportional to the rate of volume flow of said gas inside said section; and second means connected from said detector and from said turbine meter to produce an electrical output of a magnitude proportional to a function $\dot{m}$, where $$\dot{m} = Kf_o(AT^2 + BT + C),$$

and where A, B, C and K are constants, and T is a period directly proportional to the vibrational period of said tuning fork, said function being proportional to the mass flow rate of said gas inside said section, B being smaller or larger than zero or equal to zero, the sole power to said quartz tuning fork being from the flow of said gas.

2. The invention as defined in claim 1, wherein said tuning fork includes a pair of prongs and an elongated base, said prongs being fixed relative to one end of said base, the other end of said base being fixed relative to said first means.

3. The invention as defined in claim 2, wherein said turbine rotor has a hub and pitched blades fixed thereto in positions extending radially and outwardly therefrom.

4. The invention as defined in claim 3, wherein a pick-up is fixed relative to said pipe section at the lengthwise location of said turbine blades, said pick-up having an output lead, said pick-up producing a pulse on said output lead each time the outer end of a turbine blade passes proximate thereto.

5. The invention as defined in claim 4, wherein said detector includes a piezoelectric crystal fixed relative to said prongs, said crystal having an output lead connected therefrom.

6. The invention as defined in claim 5, wherein said second means is connected from said crystal lead and from said pick-up lead.

7. The invention as defined in claim 6, wherein the fundamental frequencies on said crystal and pick-up leads are directly proportional to $f_o$ and $f$, respectively, where $f = 1/T$.

8. The invention as defined in claim 1, wherein the sizes and locations of said first and second passageways and said rotor are such that the density of said gas within said enclosed space is the same as that at said rotor.

* * * * *